May 8, 1962 H. KIETZ 3,034,095
SHOCK EXCITING DEVICE FOR TRANSDUCERS
Filed Oct. 4, 1957 2 Sheets-Sheet 1
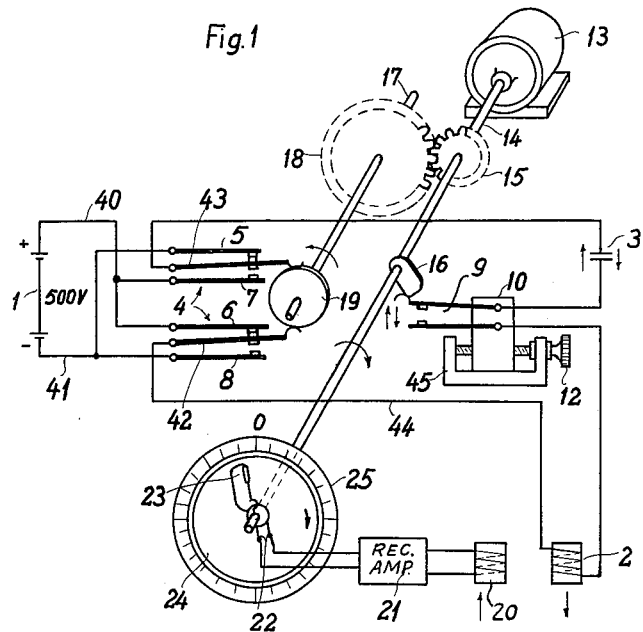
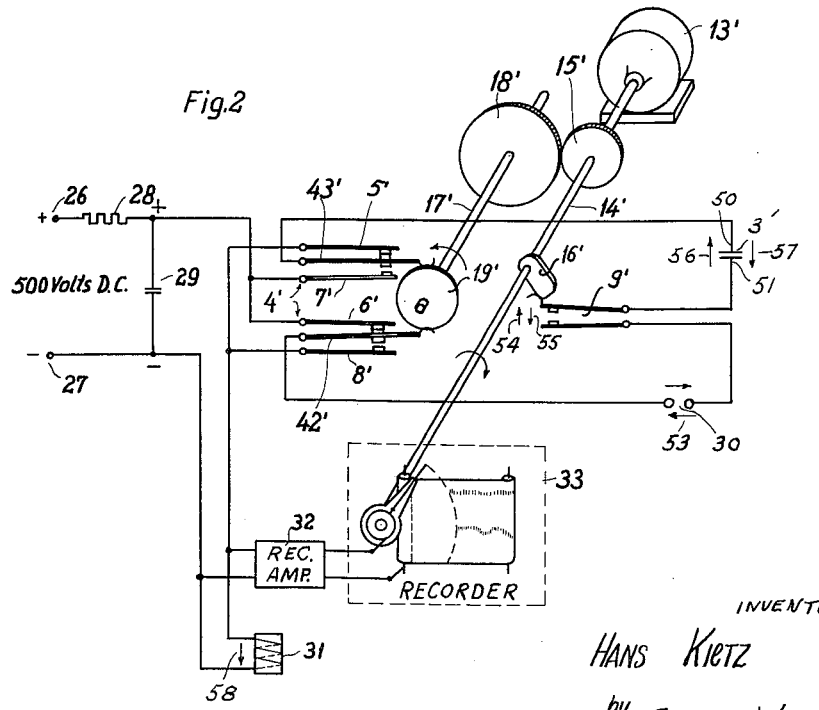
INVENTOR
HANS KIETZ
by EZEKIEL WOLF
HIS ATTORNEY May 8, 1962  H. KIETZ  3,034,095
SHOCK EXCITING DEVICE FOR TRANSDUCERS
Filed Oct. 4, 1957  2 Sheets-Sheet 2
a.) Switches 5, 6 (5', 6') closed / open
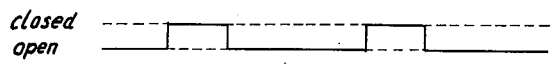
b.) Switches 7, 8 (7', 8') closed / open
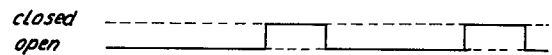
c.) Switch 9 (9') closed / open
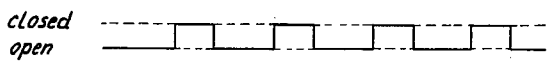
d.) Potential across condenser 3 (3' approx.)
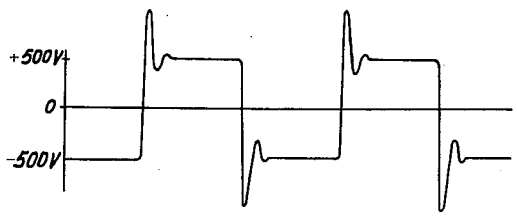
e.) Potential across transducer 2
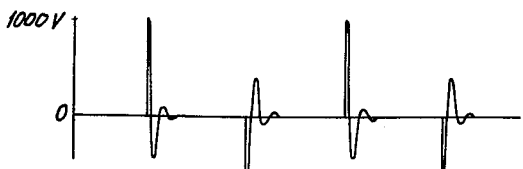
f.) Pulse current through transducer 2
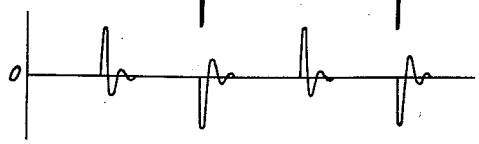
g.) Potential across transducer 31
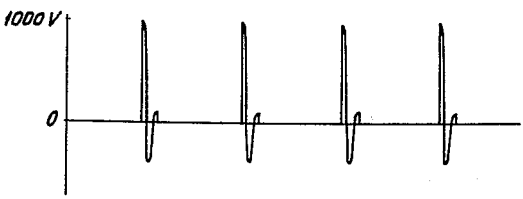
h.) Pulse current through transducer 31
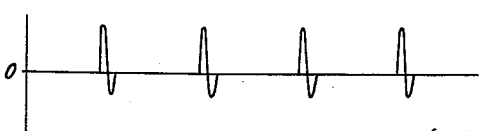
Fig.3
INVENTOR
HANS KIETZ
by EZEKIEL WOLF
HIS ATTORNEY _United States Patent Office_ 3,034,095
Patented May 8, 1962

3,034,095
SHOCK EXCITING DEVICE FOR TRANSDUCERS
Hans Kietz, Prager Str. 23, Bremen, Germany
Filed Oct. 4, 1957, Ser. No. 688,152
23 Claims. (Cl. 340—3)

This invention relates to a circuit arrangement for shock-exciting a magnetostrictive electro-acoustic transducer for echo sounding purposes and is a continuation-in-part of patent application Serial No. 384,746 filed October 7, 1953, now U.S. Patent 3,013,247.

An object of the present invention is to produce current pulses for exciting a magnetostrictive transducer by periodically connecting a source of potential having a low internal resistance with polarity alternately reversed to a condenser through the winding of the transducer, and through a periodically operated trigger switch controlling the exact moment of time at which the potential of the condenser is discontinuously reversed following each reversal of the potential source, each reversal of the potential of the condenser being accompanied by a charging current pulse flowing through the winding of the transducer.

An additional object of the invention is the provision of a source of potential having a low internal resistance which source may constitute a storage condenser, the capacity of which is large in comparison with that of a second condenser which is alternately charged to opposite potentials, the charge of the storage condenser being continuously replenished by a source of potential not necessarily having a low internal resistance.

A further object of the present invention is the insertion of a spark gap in the circuit between the source of potential and the condenser through which the condenser is charged to periodically reversed potentials. This gap is particularly adapted for circuits utilizing a single transducer for emitting and receiving signals.

Due to the inductance of the transducer the current pulse occurring in the circuit of the pulse-producing condenser at each reversal of its potential is in the shape of a rapidly decaying oscillation. This oscillatory pulse excites the transducer to mechanical vibrations, the amplitude of which, after the decay of the exciting pulse, will be a maximum if the period of the electrical oscillation is suitably matched to the mechanical resonance frequency of the transducer. With a predetermined winding of the transducer, having a given self-inductance, the best results are obtained with a pulse-producing condenser of a definite maximum capacity. This means that it is not feasible to increase the oscillatory amplitude of signals in the transducer produced by the pulse current by increasing the capacity of the pulse-producing condenser. This amplitude depends only on the magnitude of the potential jump to which the pulse-producing condenser is subjected.

In the circuit of the present invention, however, a sudden potential change in the pulse-producing condenser of the circuit, through which the equalization of potentials is effected, is obtained each time the circuit is closed with the change twice as great as the potential of the source. Therefore, in the present invention one can obtain the same results with half the source potential as compared with that required in known circuit arrangements, in order to generate a current pulse of given magnitude.

In view of the oscillatory character of the equalizing current impulse it is pointed out that in the following explanation of the invention, in referring to the direction of current pulses, that of the integral of the current flow or that of the initial current is to be understood.

Further objects of the invention as well as a more comprehensive understanding of the invention will be obtained by reference to the accompanying drawings in which:

FIGURE 1 illustrates a circuit and switching arrangement for shock-exciting a transducer by periodically connecting a source of potential with its polarity alternately reversed to a condenser through the winding of the transducer.

FIGURE 2 illustrates a modification of the invention wherein a single transducer is utilized for both emission and receipt of pulse signals.

FIGURE 3 graphically illustrates in the sequence of switching operations, including the operation of a trigger switch, the related variations of the potential across the pulse-producing condenser and the transducer, and the pulse current through the transducer.

In FIGURE 1 there is illustrated a battery 1 having a small internal resistance and having positive and negative terminals as illustrated. This battery has its terminals connected to the commutator switching means 4 through the lines 40 and 41. The line 40 is connected to the parallel arrangement of contacts 6 and 7 while the line 41 is connected to the parallel arrangement of contacts 5 and 8. Contact arms 42 and 43 are positioned to alternately and respectively engage contacts 6, 8 and 5, 7 with the arms 42 and 43 operating in synchronism to simultaneously contact the contacts 5, 6 and then 7, 8. A circuit is completed between the two contact arms 42, 43 through the line 44. In series with this line 44 is the magnetostrictive transducer 2 which serves as a shock-excited sound pulse emitter, a trigger switch 9 and a condenser 3 used for pulse production. The trigger switch 9 may be mounted on a block of insulating material 10, in turn slideably mounted in the bracket 45. This block 10 may be adjustably longitudinally displaced by the knob and screw arrangement 12 whereby the precise closing time of the trigger switch may be selectively adjusted. In this way the timing of the potential applied from the high voltage source 1 across the condenser 3 and through the transducer 2 may be adjustably controlled.

The commutator switching means 4 and the trigger switch 9 are operatively controlled by the rotatable shaft 14. This shaft 14 may form a part of an echo sounding apparatus and rotate at uniform speed of, for example, one revolution per second. The cam 16 mounted on the shaft 14 periodically engages the trigger switch 9, once on each revolution of the shaft 14. Shaft 14 also drives shaft 17 through the gears 15, 18 at half its own speed of rotation. Cam 19 rigidly secured on shaft 17 operates commutator contacts 5, 6 and 7, 8 with contacts 5, 6 being simultaneously closed to the contact arms 43, 42 respectively and then alternately the contacts 7, 8 being closed to the arms 43, 42 respectively and simultaneously. Each of these contacts are closed for less than one revolution of shaft 14. This synchronized operation may be obtained from any suitable drive source such as the constant speed motor 13 operatively engaging the shaft 14. Also connected to the shaft 14 is the ring commutator 22 having an electrical line coupling to the receiving amplifier in turn connected to the magnetostrictive transducer which serves as a sound pulse receiver. A neon tube 23 is mounted on shaft 14 for rotation about the disc 24 of insulating material. This disc 24 has imprinted upon it a circular scale indicated at 25 for indication of the relative position of the neon tube 23 when it lights, through the excitation of pulses received on the magnetostrictive transducer 20.

It will be noted that in this circuit, emitting transducer 2 is on the same side of commutator 4 as trigger switch 9 and pulse producing condenser 3. In this instance successive current pulse through the transducer are of opposite polarity. As will be noted for the modification of FIGURE 2 a single transducer may be utilized for both transmission and receipt of signals.

While it is practical to have the trigger switch 9 open before the commutator switch 4 opens, it is sufficient for operation of this device that the trigger switch 9 opens before the commutator switch 4 closes.

In actual construction of this device, a trigger switch 9 may be constructed of an electric switching means such as, for example, a thyratron tube.

In the modification illustrated in FIGURE 2, the individual components numbered with a prime are individually similar in nature to those described in connection with the description of FIGURE 1. These components are, however, rearranged and are utilized with other components to obtain a modified operation of the invention. In accordance with this modified construction the shaft 14' rotates in uniform speed of, for example, one revolution per second periodically closing the trigger switch 9' through the cam 16' which is fixed to the shaft. Shaft 14' also drives the shaft 17' through the gears 15', 18' at half its own speed of rotation. Cams 19' rigidly secured on shaft 17' operates commutator contacts 5', 6' or 7', 8', respectively, closing them alternately for less than one revolution of shaft 14'.

The pulse-producing condenser 3', which may, for example, have a capacity of one microfarad, is connected in series with trigger switch 9' and a spark gap 30. The spacing of the sparking electrodes does not exceed a few tenths of a millimeter allowing the passage of the spark at a potential difference of a few hundred volts.

Storage condenser 29 on the one hand, and, on the other hand, pulse-producing condenser 3', switch 9' and gap 30 constitute parts of a pulse circuit which are connected with alternating polarity via the contacts 5', 6' or 7', 8', respectively, through the winding of a transmitting and receiving magnetostrictive transducer 31 which is incorporated in the pulse circuit.

The circuit of FIG. 2 operates as follows. Let it be assumed that the values of the pertinent electrical elements are as follows:

Potential between terminals 26 and 27_ 500 volts.
Resistance 28_____ 1,000 ohms.
Storage condenser 29_____ 20 microfarads.
Condenser 3'_____ 1 microfarad.

During operation, condenser 29 periodically releases a portion of its charge to condenser 3'. The charge lost by condenser 29 is replenished from the potential source connected between terminals 26 and 27 as a charging current flows through resistor 28. Since the capacity of condenser 29 is much larger than that of condenser 3', the potential across the former is substantially the 500 volts across terminals 26 and 27 polarized as indicated in FIG. 2.

It is convenient to consider the charge on condenser 3' as positive and negative when the potential on terminal 51 referenced to terminal 50 is positive and negative, respectively. Initially, the potential across condenser 3' is substantially zero because it holds no charge. Rotating shaft 15' in the direction indicated by the arrow causes cam 16' to close trigger switch 9' while the stylus of recorder 33 simultaneously begins to traverse the recording strip. With commutator switches 4' in the position shown in FIG. 2, the upper plate of condenser 29 is connected through contacts 6' and 42' to the left-hand electrode of spark gap 30. The lower plate of condenser 29 is connected through transducer 31, contacts 5' and 43', condenser 3', and trigger switch 9' to the right-hand electrode of spark gap 30. A potential of 500 volts is thereby applied across spark gap 30 to break down the gap. This breakdown causes a transient current to flow in the direction of arrows 52, 54, 56 and 58, thereby charging condenser 3' to the potential across condenser 29. Condenser 3' is then charged to a potential of +500 volts.

Normal operation begins with the next closing of trigger switch 9' after shaft 14' has made a full turn and shaft 17' a half turn. Then the upper contacts of commutator switch 4' are opened and the lower contacts closed to connect the upper terminal of condenser 29 through contacts 7', 43', condenser 3', and trigger switch 9' to the right-hand electrode of spark gap 30. The lower terminal of condenser 29 is connected through transducer 31 and contacts 8' and 42' to the left-hand electrode of spark gap 30. The potential then across spark gap 30 is the sum of the potentials across condensers 29 and 3', a potential of 1,000 volts.

After spark gap 30 breaks down, this 1,000 volt potential is applied to the terminals of transducer 31 to cause a transient current flow through its winding in the direction indicated by arrow 58 and through condenser 3', trigger switch 9', and spark gap 30 in the directions of arrows 57, 55 and 53, respectively. This current flow results in condenser 3' being charged to a potential difference of −500 volts. The quantity of electrical charge displaced in the establishment of a potential balance in the circuit corresponds to a change of the potential difference across condenser 3' of 1,000 volts. Multiplication of this charge quantity by the potential difference across condenser 29 corresponds to the amount of energy used to excite transducer 31.

After one more turn of shaft 14', trigger switch 9' is again closed with commutator switch 4' in the position shown in FIG. 2. The sum of the potentials across condensers 29 and 3' appear again first across spark gap 30 and then across the winding of transducer 31 after breakdown. A steady-state balance of potentials in the circuit is established by a current pulse flowing in the directions of arrows 52, 54, 56 and 58. Observe that while the direction of current flow through spark gap 30, trigger switch 9' and condenser 3' is reversed, the direction of current flow through transducer 31 is unchanged. This current pulse charges condenser 3' to a potential of +500 volts, corresponding to a change in potential across condenser 3' of 1,000 volts since it was previously charged to −500 volts. The energy available for exciting the transducer is the same as before. The next operational cycle is the same as that previously described and begins with another turn of shaft 14', two such revolutions making up a complete operational cycle.

Operation of the system shown in FIG. 2 and also that of FIG. 1 is further explained by the graphical representation of pertinent signal waveforms plotted to a common time scale in FIG. 3, the accompanying legend making this figure self-explanatory.

The system of FIG. 1 differs from that of FIG. 2 by transducer 2 being on the same side of commutator switch 4 as condenser 3 and trigger switch 9 instead of on the opposite side as the system of FIG. 2. Consequently, the direction of sequential pulse currents through transducer 2 is alternately reversed.

Alternating current pulses of opposite polarity through the winding of the magnetostrictive transducer may be desirable and enhance the effectiveness of the excitation if the material of the transducer has pronounced magnetic remanence. On the other hand, it may be preferable to excite the transducer with a train of pulses of the same polarity if the transducer magnetic field is biased with a static magnetic field supplied by a permanent magnet or a D.-C. current flowing through a winding. In the presence of a biasing field, sequential reversals of the pulse current through the transducer winding might result in a sequence of radiated sonic pulses of unequal amplitude.

Although the available potential of the current source 26, 27 does not exceed 500 volts, the potential of the condenser 3' jumps by double the amount, that is, by 1000 volts, similar to the operation of the circuit of FIGURE 1.

It will also be noted that spark gap 30 is used only in combination with a single transducer provided both for emitting and receiving. This discharge gap 30 may, if desired, be incorporated into an inert gas filled tube, or a vacuum tube. The gap 30 may also be combined with the trigger switch 9 in an electronic switching means such as a thyratron.

The shaft 14' may operatively engage a recording stylus of a conventional echo depth recorder of suitable construction, such as illustrated at 33. In this arrangement the amplifier 32 connected across terminals of the transducer 31 has incorporated into it a suitable device for protecting the input terminals from high voltage outputs. This amplifier is connected operatively to the recording stylus of the depth recorder 33 by conventional means.

While the source voltage may, of course, be varied depending upon the particular usage of the circuit, it has been found that for echo sounding purposes in shallow depths a potential of 200 volts is sufficient.

The timing of the periodical operation of the switches of both FIGURES 1 and 2 is shown in FIGURE 3 a, b, c. The related variations of the charging potential of condenser 3 (3') and the potential across the transducer 2, (31) are shown by curves d and e, respectively. The current pulses through transducer 2, (31) produced by each reversal of the charging potential of condenser 3 (3') are shown by curve f.

The potential of the storage condenser 29 in FIGURE 2 falls only by a small amount when condenser 3' is charged. The energy loss resulting from the current replenishing the charge of condenser 29 through the resistance 28 is small in comparison with the pulse energy exciting the transducer.

In both modifications the commutator contacts 5, 6, 7 and 8 (5', 6', 7' and 8') are closed or opened only with trigger switch 9 (9') opened, and are not subject to wear by sparking. Sparking is confined to switch 9 (9'). However, owing to the perpetual change of the direction of the pulse current through the switch at each operation of the switch the damage from sparking is substantially smaller than with current flowing always in the same direction.

Since the pulse is triggered exclusively by switch 9 (9') it is possible to time the excitation of the transducer 2 (31) accurately in synchronization with the rotation of shaft 4 through adjustment of knob and screw arrangement 12. This is an important consideration when using the arrangement as part of or in combination with an echo sounding apparatus.

On account of the oscillatory character of the pulses current, transducer 2 (31) is in general demagnetized with the pulse excitation devices hitherto used. Therefore, it cannot be used as receiver for signals in the modification of FIGURE 2 without additional polarizing devices. By the incorporation of the spark gap 30 in this pulse circuit the oscillatory current flowing through the series circuit comprising capacitor 3' is interrupted before this current amplitude has dropped to zero and the transducer retains a magnetic polarization after the passing of a pulse. This is particularly advantageous when using the same transducer in an echo sounding equipment for emitting sound impulses and for receiving the returning echoes.

Due to the fact that the direction of the current pulses is perpetually changing in the spark gap just as is the case for trigger switch 9 (9') a long life of the sparking electrodes is insured without readjustment or cleaning being necessary.

By avoiding unnecessary energy losses the pulse exciting device according to the invention makes a smaller demand on the capacity of the current source than that made by the hitherto known devices.

The switch contacts in the pulse circuit, in particular the trigger switch 9 (9') can also be operated indirectly by electromagnetic relays.

The device described is equally applicable to shock exciting electromagnetic transducers instead of magnetostrictive transducers.

The sources of potential used in the pulse circuit should have a small internal resistance. Sources of potential suitable to be used for the purpose of the invention may be batteries or large capacity condensers which are charged by a battery or a power unit. The capacity of these storage condensers has to be ten to twenty times larger than that of the pulse-producing condenser so that the percentage potential decrease caused by the current pulses is insignificant.

What is claimed is:

1. A circuit for periodical excitation of a magnetostrictive electro-acoustic transducer by a pulse current at a predetermined time, and particularly adapted for the production of sound pulses for echo sounding in an echo sounder having periodically moving echo indicator means, comprising a high voltage direct current source having a low internal resistance, a pulse producing condenser in series with a trigger switch, means including said last two elements forming a series connection, a transducer having a winding adapted to excite said transducer by current passing therethrough, switching means for connecting said high voltage source across a series combination of said series connection and said transducer winding for producing current pulses through said winding, successive ones of said current pulses being of opposite polarity, means for opening and closing said trigger switch including means for maintaining said trigger switch open during each operation of said switching means, and means for adjustably timing the closing of the trigger switch after closing of said switching means whereby the timing of the potential applied from said high voltage source across said condenser and through said transducer may be controlled.

2. A circuit for periodic excitation of a magnetostrictive electro-acoustic transducer by a pulse current at a predetermined time, and particularly adapted for the production of sound pulses for echo sounding in an echo sounder having periodically moving echo indicator means, comprising, a high voltage direct current source having a low internal resistance, a pulse producing condenser in series with a trigger switch, means including said last two elements forming a series combination, a transducer having a winding adapted to excite said transducer by current passing therethrough, switching means for connecting said high voltage source across a series combination of said series connection and said transducer winding for producing current pulses through said winding, means for opening and closing said trigger switch including means for maintaining said trigger switch open during each operation of said switching means, and means for adjustably timing the closing of the trigger switch after closing of said switching means whereby the timing of the potential applied from said high voltage source across said condenser and through said transducer may be controlled, said transducer being used for both emission and reception of sound pulses, and means defining a spark gap in series with said condenser and trigger switch adapted to permit a discharge for potential differences smaller than the potential of said source.

3. A circuit for periodic excitation of a magnetostrictive electro-acoustic transducer by a pulse current at a predetermined time, and particularly adapted for the production of sound pulses for echo sounding in an echo sounder having periodically moving echo indicator means, comprising, a high voltage direct current source having a low internal resistance, a pulse producing condenser in series with a trigger switch, means including said last two elements forming a series connection, a transducer having a winding adapted to excite said transducer by current passing therethrough, switching means for connecting said high voltage source across a series combination of said series connection and said transducer winding for producing current pulses through said winding, means for opening and closing said trigger switch including means for maintaining said trigger switch open during each operation of said switching means, and means for adjustably timing the closing of the trigger switch after closing of said switching means whereby the timing of the potential applied from said high voltage source across said pulse producing condenser and through said transducer may be controlled, said high voltage source comprising a second condenser having a capacity large in comparison with the capacity of said pulse producing condenser and current source means for continuously charging said second condenser.

4. In a circuit for periodical excitation of a magnetostrictive electro-acoustic transducer by a pulse current at a predetermined time particularly adapted for production of sound pulses in echo sounding apparatus comprising a high voltage direct current source, a series connection including a pulse producing condenser and a trigger switch, a transducer having a winding adapted to excite said transducer by current passing therethrough, said winding connected in series with said source and series connection, switching means for coupling current from said high voltage source alternately reversed in polarity to said series connection, and means for opening and closing said switching means and said trigger switch in synchronized relationship including means for maintaining said trigger switch open during the operation of said switching means.

5. A circuit for periodical excitation of a magnetostrictive electro-acoustic transducer by a pulse current at a predetermined time, and particularly adapted for the production of sound pulses for echo sounding in an echo sounder having periodically moving echo indicator means, comprising a high voltage direct current source having a low internal resistance and high and low potential terminals, a pulse producing condenser and a trigger switch, a transducer having a winding adapted to excite said transducer by current passing therethrough, said voltage source and transducer comprising a first series connection, said pulse producing condenser and trigger switch comprising a second series connection, commutator switching means for alternately connecting the two ends of the first series connection with the two ends of the second series connection for sequential periods of time, said successive periods of time being in synchronied time relation to the movement of said indicator means.

6. A circuit for periodical excitation of a magnetostrictive electro-acoustic transducer by a pulse current at a predetermined time, and particularly adapted for the production of sound pulses for echo sounding in an echo sounder having periodically moving echo indicator means, comprising a high voltage direct current source having a low internal resistance and high and low potential terminals, a pulse producing condenser and a trigger switch, a transducer having a winding adapted to excite said transducer by current passing therethrough, said voltage source and transducer comprising a first series connection, said pulse producing condenser and trigger switch comprising a second series connection, commutator switching means for connecting in a pulse current carrying series combination both of said series circuits for sequential periods of time with the relative polarity of said circuits reversed during said successive periods of time, and means providing a synchronized time relation between said sequential periods of time and the movement of said indicator means.

7. A circuit for periodical excitation of a magnetostrictive electro-acoustic transducer by a pulse current at a predetermined time, and particularly adapted for the production of sound pulses for echo sounding in an echo sounder having periodically moving echo indicator means, comprising a high voltage direct current source having a low internal resistance and high and low potential terminals, a pulse producing condenser and a trigger switch, a transducer having a winding adapted to excite said transducer by current passing therethrough, said voltage source and transducer comprising a first series connection having relatively positive and negative terminals, said pulse producing condenser and trigger switch comprising a second series connection with two end terminals, commutator switching means for establishing connections between said positive terminal and one end terminal, negative terminal and the other end terminal and alternately for sequential periods said positive terminal to said other end terminal, said negative terminal to said one end terminal, said sequential time periods being in synchronized time relation with the movement of said indicator means.

8. A circuit for periodical excitation of a magnetostrictive electro-acoustic transducer by a pulse current at a predetermined time, and particularly adapted for the production of sound pulses for echo sounding in an echo sounder having periodically moving echo indicator means, comprising a high voltage direct current source having a low internal resistance and high and low potential terminals, a pulse producing condenser and a trigger switch, a transducer having a winding adapted to excite said transducer by current passing therethrough, said voltage source and transducer comprising a first series connection, said pulse producing condenser and trigger switch comprising a second series connection, commutator switching means for alternately connecting the two ends of the first series connection with the two ends of the second series connection for sequential periods of time, and means operated in synchronism with the movement of said indicator means for closing the trigger switch after the initiation of each of said periods of time thereby producing current pulses through the winding of the transducer in accurately constant time relation with the movement of the indicator means.

9. A device as set forth in claim 8 wherein said means for operating in synchronism is adapted to open the trigger switch before the initiation of a successive period of time.

10. A device as set forth in claim 4 wherein said switching means is electrically interposed between said voltage source on one side and on the other side said trigger switch, pulse producing condenser and transducer.

11. A device as set forth in claim 4 wherein said switching means is electrically interposed between said voltage source and transducer on the one side and on the other said trigger switch and pulse producing condenser.

12. In a circuit for periodical excitation of a magnetostrictive electro-acoustic transducer by a pulse current at a predetermined time particularly adapted for production of sound pulses in echo sounding apparatus comprising a high voltage direct current source having high and low potential terminals, a series connection including a pulse producing condenser and a trigger switch, a transducer having a winding adapted to excite said transducer by current passing therethrough, said winding connected in series with said source and series connection, switching means interposed electrically between said transducer and series connection for connecting said high voltage source with said high and low potential terminals alternately reversed across said series connection, and means for opening and closing said switching means and trigger switch in synchronized relationship including means for maintaining said trigger switch open during the operation of said switching means.

13. A device as set forth in claim 12 providing an echo indicating means electrically coupled to said device, pulse receiving means for receiving reflected echoes from said transducer coupled to said indicating means, whereby pulses excited in said transducer and in said pulse receiving means are displayed in relative time relation in said indicating means.

14. In a circuit adapted for echo sounding devices means providing a high voltage direct current source, having high and low potential terminals, a pulse producing condenser, a transducer having a winding adapted to excite said transducer by current passing therethrough, means for connecting said condenser between said terminals alternately in alternate directions, and means for intermittently discharging said condenser through said transducer after connecting said condenser with said successive discharges occurring at selected time intervals.

15. In an echo sounding system, a D.-C. voltage source having a low internal resistance, an electro-acoustic transducer having a winding, a series combination including a capacitor and normally non-conductive coupling means operable to allow the passage of current surges therethrough, switching means for alternately connecting said voltage source, said series combination and said transducer winding in series for sequential periods of time such that the polarity of said source with respect to said capacitor is reversed from one period to the next, and means for synchronously operating said switching means and said coupling means whereby said coupling means becomes conductive once within each of said periods of time.

16. Apparatus in accordance with claim 15 wherein said D.-C. voltage source is a storage condenser having a capacity much larger than that of said capacitor, and further comprising a source of direct potential, and a resistor connecting the latter source to said storage condenser.

17. Apparatus in accordance with claim 15 wherein said coupling means comprises a make and break switch in series with a spark gap.

18. Apparatus in accordance with claim 15 wherein a terminal of said transducer winding is permanently connected to a terminal of said voltage source.

19. Apparatus in accordance with claim 15 wherein one terminal of said transducer winding is permanently connected to a terminal of said series combination.

20. In a system for periodically transmitting pulses of sonic energy, apparatus comprising, an electro-acoustic transducer including a winding responsive to current pulses for causing said transducer to provide sonic energy pulses, a D.-C. voltage source capable of delivering large amplitude current pulses with a relatively small internal voltage drop, a series combination including said transducer winding, a capacitor and a normally open make and break switch, commutator switching means for connecting said voltage source with polarity alternately reversed across said series combination for sequential periods of substantially equal length, means for periodically operating said commutator switching means and said make and break switch in such time relationship that said latter switch is closed for a fraction of each of said periods.

21. Apparatus in accordance with claim 20 wherein said means for periodically operating said commutator switching means and said make and break switch include a shaft driven at substantially constant speed, gear means and cam means for actuating moveable contacts associated with said commutator switching means and said make and break switch, and means for adjusting the time relationship between the closure of said make and break switch and the angular orientation of said shaft.

22. In a system for periodically transmitting pulses of sonic energy, apparatus comprising, an electro-acoustic transducer including a winding responsive to current pulses for causing said transducer to provide sonic energy pulses, a D.-C. voltage source capable of delivering large amplitude current pulses recurrently with a relatively small internal voltage drop, a series combination comprising, said transducer winding, a capacitor and a normally open trigger switch, commutator switching means having two different positions for alternately connecting said voltage source with opposite polarities across said series combination, first operating means for periodically changing the position of said commutator switching means, and second operating means synchronized with said first operating means for closing said trigger switch and reopening it once within each of the periods between operations of the commutator switching means, each operation of said commutator switching means producing a condition of voltage unbalance in the circuit including said commutator switching means and seubsequent closure of said trigger switch allowing the voltage in said circuit to be rebalanced in response to a transient current flowing through said transducer winding and reversing the charge polarity upon said capacitor.

23. Electromechanical apparatus comprising, electroacoustic transducing means having at least one winding thereon responsive to current pulses for providing sonic pulses, a high voltage direct current source, a series connection including a pulse producing condenser and a trigger switch, means for connecting said winding, said series connection and said source in series, switching means for coupling current from said high voltage source alternately reversed in polarity to said series connection, means for opening and closing said switching means and said trigger switch in synchronized relationship including means for maintaining said trigger switch open during the operation of said switching means, the operation of said switching means exciting said winding with a current pulse to cause said transducing means to provide a sonic pulse, said transducing means including pulse receiving means for receiving reflected echoes from said sonic pulses, and an echo indicating means electrically coupled to said pulse receiving means for displaying in relative time relation said sonic pulses and said reflected echoes.

References Cited in the file of this patent

UNITED STATES PATENTS

| | | |
|---|---|---|
| 2,167,536 | Suits | July 25, 1939 |
| 2,561,851 | Fryklund | July 24, 1951 |
| 2,852,676 | Joy | Sept. 16, 1958 |